July 6, 1926.

H. E. DURKEE

TAILSTOCK

Filed April 6, 1923

1,591,026

INVENTOR
H. E. Durkee.
BY
ATTORNEY

Patented July 6, 1926.

1,591,026

UNITED STATES PATENT OFFICE.

HENRY E. DURKEE, OF GLASTONBURY, CONNECTICUT, ASSIGNOR TO PRATT & WHITNEY COMPANY, OF NEW YORK, N. Y., A CORPORATION OF NEW JERSEY.

TAILSTOCK.

Application filed April 6, 1923. Serial No. 630,366.

This invention relates to tailstocks and the primary object of the invention is the provision of an improved tailstock of simple design and one capable of easy and effective operation.

A further object of the invention is to provide an improved tailstock adapted to be operated by a single handle to effect the engagement or disengagement of the work piece by the tailstock spindle and to also effect the clamping of the spindle, movement of the handle in one direction being adapted to withdraw the spindle and movement of the handle in the opposite direction being adapted to permit a non-positively acting means to engage the spindle with the work piece and to thereafter securely clamp the spindle against movement. The said non-positively acting means preferably comprises a spring whereby the work engaging center in the spindle is automatically engaged with the work with a definite predetermined pressure, the handle being operative to slide the spindle in the work disengaging direction only.

With the above and other objects in view, my invention consists in the features of construction and operation set forth in the following specification and illustrated in the accompanying drawing. In such drawing annexed hereto and forming a part of this specification, I have shown one embodiment of my invention but it will be understood that the invention can be otherwise embodied and that the drawing is not to be construed as defining or limiting the scope of the invention, the claims appended to this specification being relied upon for that purpose.

Referring to the figures of the drawing:—

Figure 1:
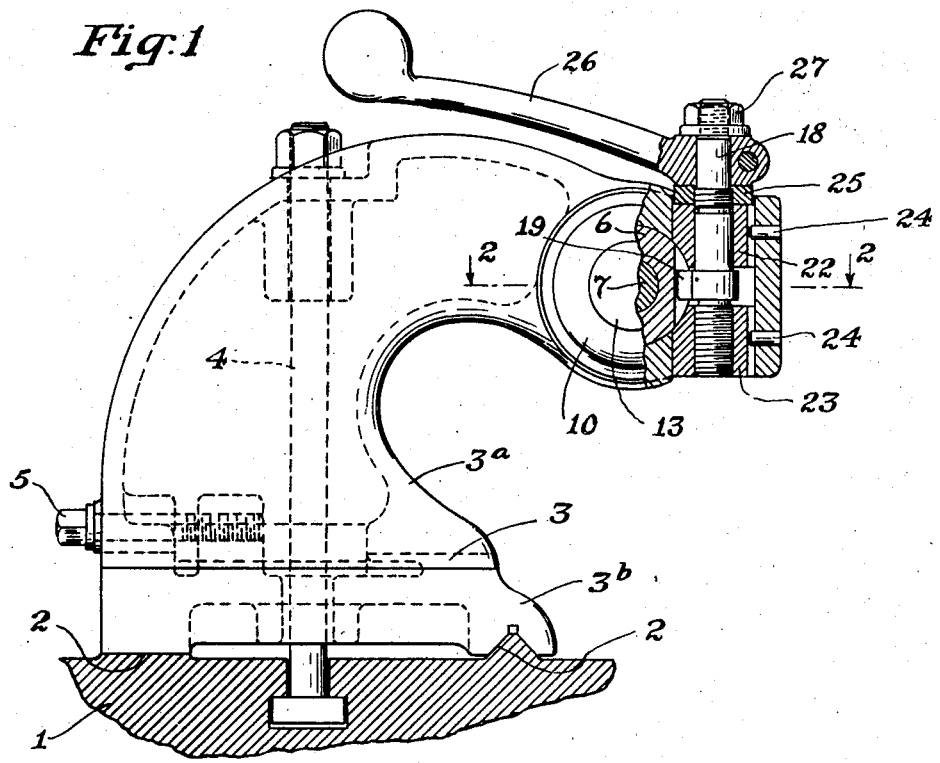
Figure 1 is an end elevation of my improved tailstock partially in section.
Figure 2:
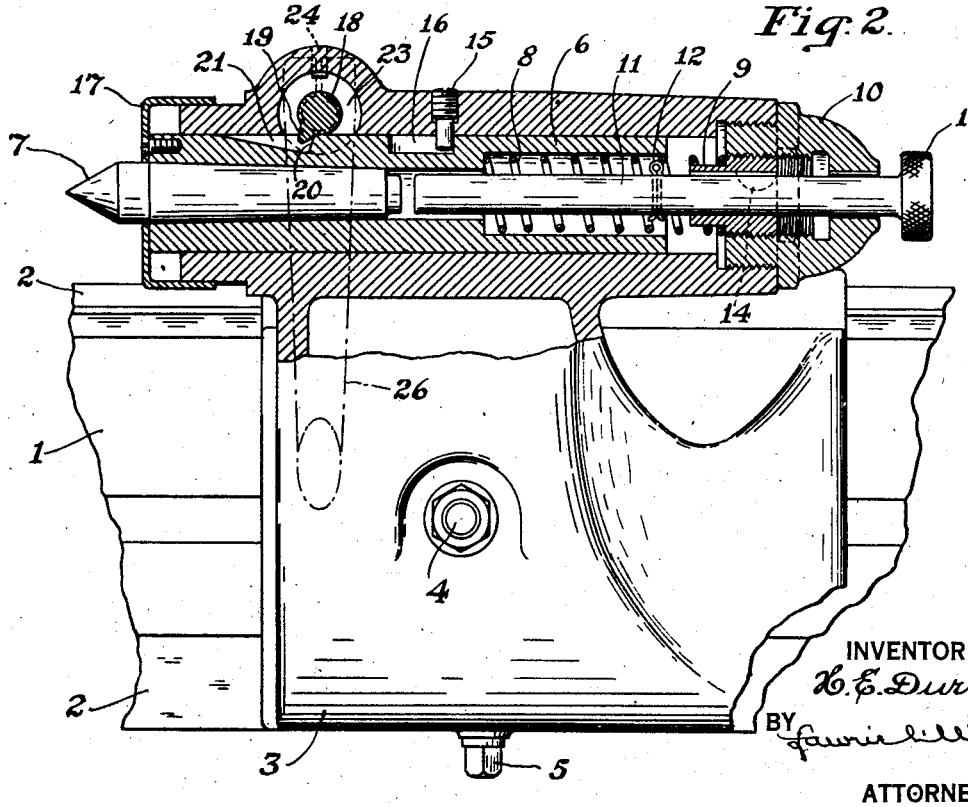
Fig. 2 is a plan view thereof shown in longitudinal section on line 2—2 of Fig. 1.

In accordance with my invention, the operator, after clamping the tailstock in place on the lathe bed, may by the operation of a single handle, control the engagement of the spindle center with the work and clamp the spindle in its work engaging position. It will be noted that the mechanism as illustrated is extremely simple, such mechanism comprising broadly a spindle, a spring for moving the spindle forwardly to engage the center with the work and a shaft extending transversely of the spindle and operating by a movement in one direction to withdraw the spindle against the action of the spring and by a movement in the opposite direction to permit the spring to engage the center with the work and operating thereafter to securely clamp the spindle against movement. The mechanism will now be specifically described.

Referring to the drawing by reference characters, 1 indicates the lathe bed on the ways 2 of which the tailstock 3 is slidably mounted. A clamping bolt 4 is provided for securing the tailstock in its adjusted position on the bed. The upper portion 3ª of the tailstock may be adjusted transversely on the lower portion by means of a screw 5 mounted in the portion 3ª and threadedly engaging a lug on the portion 3ᵇ.

A spindle 6 is slidably mounted in the tailstock and supports a work engaging center 7 in its forward end. The spindle is normally moved in a forward direction under the action of a spring 8 as hereinafter described. This spring 8 is seated in a counterbore in the rear end of the spindle and is compressed between the spindle and a bushing 9 screw threaded into a plug 10 also screw threaded into the rear end of the tailstock.

A rod 11 extends through the plug 10 and bushing 9. A cotter pin 12 limits the outward movement of the rod and a knob 13 is provided on the outer end of the rod for manipulating the same. It will furthermore be noted that the bushing 9 is splined to the rod by means of a key 14. The function of the rod is two-fold. The rod may be moved inwardly to drive the center 7 from the spindle and rotation of the rod rotates the bushing 9 and thereby adjusts the compression of the spring 8.

Rotation of the spindle and longitudinal movement thereof in either direction is limited by a screw 15 threaded into the tailstock and extending into a groove 16 in the spindle. The forward end of the spindle is also preferably protected from dust and dirt by means of a cap 17 secured to the spindle and slidable over the forward end of the tailstock.

Mounted transversely of the spindle in the tailstock is a shaft 18 provided with a tooth 19 for engaging a shoulder 20 formed in a recess 21 in the spindle. One end of the shaft is supported in a bushing 22 at one side of the tooth 20 and the other end thereof is threaded into a bushing 23 at the other side of the tooth. Pins 24 prevent rotation of these bushings but permit of their movement longitudinally. A nut 25 is threaded to the shaft directly against the bushing 22 and an operating handle 26 is mounted on the shaft between the nut 25 and a nut 27. It will be noted that the bushings bear against the spindle respectively at opposite sides of the center thereof. Rotation of the shaft in one direction will draw the bushings together and bind the spindle against movement therebetween and rotation of the shaft in the opposite direction will release the same.

The operation of the mechanism is as follows: The tailstock is first adjusted to the proper position on the bed and clamped thereto. The bushing 9 is rotatably adjusted to place the spring 8 under the proper work engaging compression. The operator then moves the handle 26 backwardly to withdraw the spindle and permit the insertion of the work. The handle is then moved forwardly to permit the center 7 to engage the work, under the action of the spring 8. Because of the shape of the recess 21, it will be noted that the handle 26 can operate to move the spindle longitudinally only in the backward direction. When the center 7 engages the work, continued forward movement of the handle 26 will operate to draw the clamping bushings 22 and 23 together and bind the spindle 6 therebetween, it being understood that the bushing 23 and nut 25 have been properly adjusted in their threaded engagement with the shaft 18. It should furthermore be noted that the combined pressures of the bushings on the spindle operate in a direction directly toward the center of the spindle thereby avoiding any objectionable sidewise pressure which would act to throw the spindle out of alignment.

What I claim is:—

1. A lathe tailstock comprising in combination, a frame, a spindle longitudinally slidable therein, non-positively acting means for moving the spindle forwardly to engage a work piece, and other means adapted by a movement in one direction to withdraw the spindle and by a movement in the opposite direction to clamp the spindle against movement.

2. A lathe tailstock comprising in combination, a frame, a spindle longitudinally slidable therein, resilient means for moving the spindle forwardly to engage a work piece, and means adapted by a movement in one direction to withdraw the spindle against the action of the resilient means and by a movement in the opposite direction to clamp the spindle against movement.

3. A lathe tailstock comprising in combination, a frame, a spindle longitudinally slidable therein, a spring for moving the spindle forwardly to engage a work piece, and means adapted by a movement in one direction to withdraw the spindle against the action of the spring and by a movement in the opposite direction to clamp the spindle against movement after the spindle has engaged the work piece.

4. A lathe tailstock comprising in combination, a frame, a spindle longitudinally slidable therein, resilient means for moving the spindle forwardly to engage a work piece, a shaft extending transversely of the spindle, and means operative by rotation of the shaft in one direction to withdraw the spindle against the action of the resilient means and by rotation in the opposite direction to clamp the spindle against movement after the spindle has engaged the work piece.

5. A lathe tailstock comprising in combination, a frame, a spindle longitudinally slidable therein, a spring for moving the spindle forwardly to engage a work piece, a shaft extending transversely of the spindle and provided with a projection engaging a shoulder on the spindle, and clamping means screw threadedly connected to the shaft, rotation of the shaft in one direction being adapted to withdraw the spindle against the action of the spring and rotation thereof in the opposite direction being adapted to clamp the spindle against movement after the spindle has engaged the work piece.

6. A lathe tailstock comprising in combination, a frame, a spindle longitudinally slidable therein, a spring for moving the spindle forwardly to engage a work piece, a shaft extending transversely of the spindle, interconnected means between the shaft and spindle whereby rotation of the shaft may move the spindle in a rearward direction only, and means for clamping the spindle, the construction being such that rotation of the shaft in one direction operates to withdraw the spindle against the action of the spring and rotation thereof in the opposite direction permits the spring to engage the spindle with the work and thereafter operates the clamping means to secure the spindle against movement.

7. A lathe tailstock comprising in combination, a frame, a spindle longitudinally slidable therein, a spring for moving the spindle forwardly to engage a work piece, a shaft extending transversely of the spindle, a tooth on the shaft engaging against a shoulder on the spindle to move the latter rearwardly, a binder clamp threadedly connected to the shaft and engaging against the spindle, and an operating handle on the shaft, rotation of the shaft in one direction being adapted to withdraw the spindle against the action of the spring and rotation thereof in the opposite direction first permitting the spring to engage the spindle with the work and thereafter operating to draw the binder clamp into clamping engagement with the spindle.

8. A lathe tailstock comprising in combination, a frame, a spindle longitudinally slidable therein, resilient means for moving the spindle forwardly to engage a work piece, a shaft extending transversely of the spindle, means on the shaft for engaging the spindle to permit forward movement of the spindle when the shaft is rotated in one direction and operative to move the spindle rearwardly against the action of the resilient means when the shaft is rotated in the opposite direction, a pair of spindle engaging binder clamps on the shaft respectively at opposite sides of the said means thereon, and cooperating means for drawing the clamps together to clamp the spindle in its work engaging position upon rotation of the shaft in the said one direction.

9. A lathe tailstock comprising in combination, a frame, a spindle longtitudinally slidable therein, a bushing mounted in the rear end of the frame in axial alignment with the spindle, a rod connected to and extending through the bushing and into the spindle, and a compression spring between the bushing and spindle, rotation of the rod being adapted to move the bushing longitudinally and thereby adjust the compression of the spring and the rod being adapted to be moved longitudinally in the bushing to remove the work engaging center from the spindle.

10. A lathe tailstock comprising in combination, a frame, a spindle longitudinally slidable therein, the rear end of the spindle being recessed, a bushing threaded into the rear end of the frame in axial alignment with the spindle, a rod splined to and extending through a bushing and into the spindle, a compression spring surrounding the rod in the said recess between the bushing and spindle, rotation of the rod being adapted to move the bushing longitudinally and thereby adjust the compression of the spring and the rod being adapted to be moved longitudinally in the bushing to remove the work engaging center from the spindle, and means for moving the spindle rearwardly against the action of the spring.

In testimony whereof, I hereto affix my signature.

HENRY E. DURKEE.